United States Patent [19]

Nemoto et al.

[11] 4,445,159
[45] Apr. 24, 1984

[54] CHASSIS FOR VIDEO TAPE RECORDER

[75] Inventors: Masanori Nemoto, Ibaraki; Hideki Asano, Mito, both of Japan

[73] Assignee: Hitachi, Ltd., Tokyo, Japan

[21] Appl. No.: 324,670

[22] Filed: Nov. 24, 1981

[30] Foreign Application Priority Data

Nov. 29, 1980 [JP] Japan ................................ 55-168247
Dec. 10, 1980 [JP] Japan ................................ 55-174839

[51] Int. Cl.³ .................... G11B 19/00; G11B 5/08; G11B 5/008; B29F 1/00
[52] U.S. Cl. ...................................... 360/137; 360/85; 360/93; 264/328.18
[58] Field of Search ............... 360/85, 90–96, 360/137; 264/328.12, 328.18

[56] References Cited

U.S. PATENT DOCUMENTS

| | | | |
|---|---|---|---|
| 4,255,367 | 3/1981 | Wallace et al. | 264/328.18 X |
| 4,257,992 | 3/1981 | Schulte et al. | 264/328.18 X |
| 4,258,399 | 3/1981 | Iijima et al. | 360/95 X |
| 4,340,562 | 7/1982 | Gross et al. | 264/328.18 X |
| 4,356,230 | 10/1982 | Emanuel et al. | 264/328.18 X |

FOREIGN PATENT DOCUMENTS

| | | | |
|---|---|---|---|
| 1288393 | 10/1962 | France | 264/328.12 |
| 53-112957 | 10/1978 | Japan | 264/328.12 |
| 2047253 | 11/1980 | United Kingdom | 264/328.18 |

Primary Examiner—Aristotelis M. Psitos
Assistant Examiner—K. Wong
Attorney, Agent, or Firm—Antonelli, Terry & Wands

[57] ABSTRACT

A chassis for video tape recorder molded integrally with a fiber-reinforced plastic composition is light in weight and can meet the requirements for attainment of high precision. It is possible to obtain a chassis with even higher precision and higher rigidity while preventing deformation with time as well as creep deformation, by properly selecting the components of the composition, the number and the position of the gates, and/or the reinforcing measures. In case of using glass fiber as the reinforcing fiber component of the composition, it is desirable to use the type in which 5% by weight or more of the whole glass fiber component is occupied by those glass fibers which have a length of over 1.0 mm and a diameter of 15 μm or less.

20 Claims, 31 Drawing Figures

CHASSIS FOR VIDEO TAPE RECORDER

BACKGROUND OF THE INVENTION

This invention relates to a chassis for video tape recorders (hereinafter referred to as VTR.

The chassis for VTR is designed to carry various precision machine components for driving VTR such as a guide drum (cylinder) with magnetic head, capstan roller magnetic tape cassette, etc., and the accessory parts thereof, and it is also provided with the protuberances and recessions or openings for supporting and fixing these carried elements as well as the walls, grooves and holes for guiding the movements of the movable component parts. For producing a chassis, generally either of the following two systems have been employed: a chassis blank is first molded by aluminum die casting, and then the chassis blank if subjected to precision working, with the metal protuberances being caulked or by fixing screw means, or a steel sheet is press worked and then the metal protuberances are caulked or fixed by screwing. Therefore, no matter which system is employed, the production cost is high because of the long manufacturing process. Also, according to these system, the produced chassis is heavy because of use of metal, and if a reduction in the weight is attempted by decreasing the wall thickness, there is a lowering of rigidity or reduction of the production yield. Thus, there was a certain limitation to the efforts for weight reduction according to the prior art.

One of effective means for realizing a weight reduction and improvement of the production process is an adoption of integral molding by use of plastics. Generally, however, use of plastics results in a product which tends to suffer deformation with the lapse of time as well as creep deformation, and further, since high dimensional precision is required and also loading weight is high in the case of the chassis for VTR, many difficulties remain to be surmounted for adaptation of plastics of such chassis. Although U.S. Pat. No. 3,899,795 proposes a plastic-made chassis for a so-called cassette tape recorder, no commercial adaptation of plastic to the chassis for VTR has yet been realized due to the fact that the chassis for VTR is greater in volume than the chassis for cassette tape recorder and hence more liable to suffer deformation in use.

SUMMARY OF THE INVENTION

The present invention has for its object to provide a plastic chassis for a VTR which is highly deformation proof with time.

The chassis for VTR according to this invention is characterized by an integral molding with a fiber-reinforced plastic composition, with the chassis being provided and a first hole for installing a guide drum with a magnetic head and a second hole for installing a capstan roller. If a reinforcing rib is provided between the region including said first hole (the tape driving mechanism carrying region) and the region including said second hole (the transmission mechanism carrying region), the device will become even more resistant to creep deformation. Also, multiplication of the gates will ensure even more positive prevention of deformation with time.

BRIEF DESCRIPTION OF THE DRAWINGS

FIG. 1 (a) is a schematic plan view of a chassis for a VTR constructed in accordance with the present invention;

DETAILED DESCRIPTION OF THE PREFFERED EMBODIMENTS

Figure 1A:
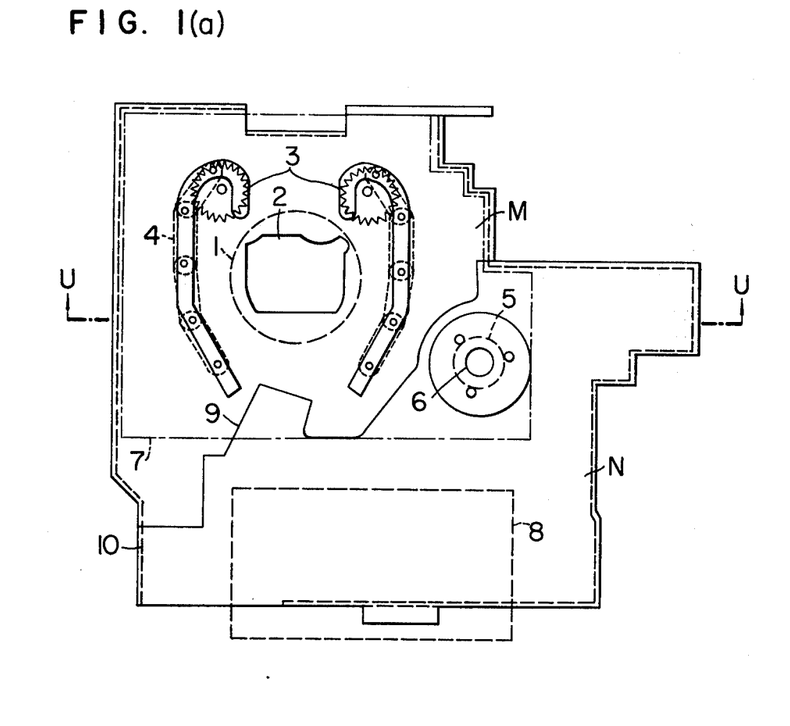
Figure 1B:
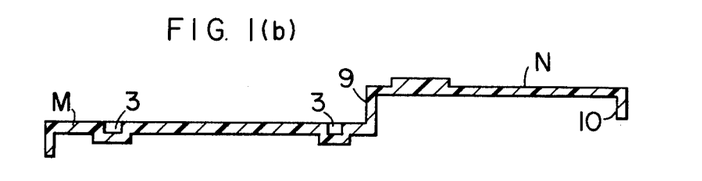
FIG. 1(b) is a cross-sectional view taken along the line U—U in FIG. (a)

Referring now to the drawings wherein like reference numerals are used throughout the various views to designate like parts and, more particularly, to FIG. 1(a) and 1(b) according to these figures, a tape driving mechanism region M has a hole 2 for accommodating a bearing fixture of a guide drum 1 having a magnetic head, and two guide grooves or guide walls 3 encompassing the hole 2. The two guide grooves 3 are arranged in a symmetrical relationship to each other on both sides of the hole, with each of the guide grooves 3 being designed to determine the locus of movement of a link member 4 which drives a guide roller base. The guide roller base is a member which functions to draw out the magnetic tape from a magnetic tape cassette and load the same around a magnetic head and capstan roller to be described hereinbelow. As shown in FIG. 1(b), the guide grooves 3 have a sectional view so that they can serve as a rib reinforcement. A sub-chassis 7 is arranged so as to overlay the tape driving mechanism region M.

A driving mechanism carried region N has a hole for accommodating a shaft of the capstan roller 5 and a section 8 designed to fit a cassette holder in which a magnetic tape is set.

Both regions M and N are molded integrally to each other by using a composition prepared, for example, by blending 0.7 mm long glass fibers in poly carbonate in an amount of 25% of the overall weight of the composition. According to this composition, glass fibers are well dispersed to effectively prevent deformation of the chassis with time.

A stepped portion 9 represent a demarcation between the two regions M and N, and a reinforcing rib 10 is provided at most of the outer periphery of the chassis. The stepped portion 9 and reinforcing rib 10 are conducive to further improvement of rigidity, strangth and dimensional precision of the chassis for VTR. The effect of the stepped portion 9 and the reinforcing rib 10 is credited to diversifsied orientation of glass fibers during molding. Also, the stepped portion 9 has an effect of absorbing vibrations in combination with the sub-chassis 7. Further, the rib reinforcing action of the stepped portion 9 and reinforcing rib 10 proves helpful for preventing creep deformation.

Figure 2A:
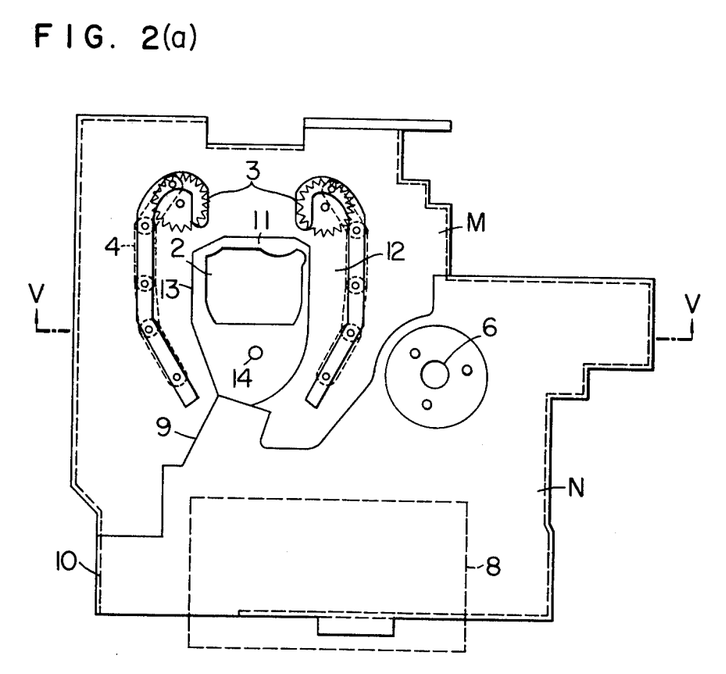
FIG. 2(a) is a schematic plan view of another embodiment of a chassis for a VTR constructed in accordance with the present invention.
Figure 2B:
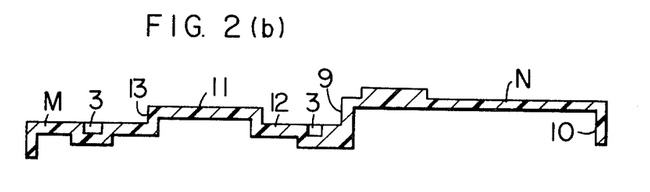
FIG. 2(b) is a cross-sectional view taken along the line V—V in FIG. 2(a)
Figure 3A:
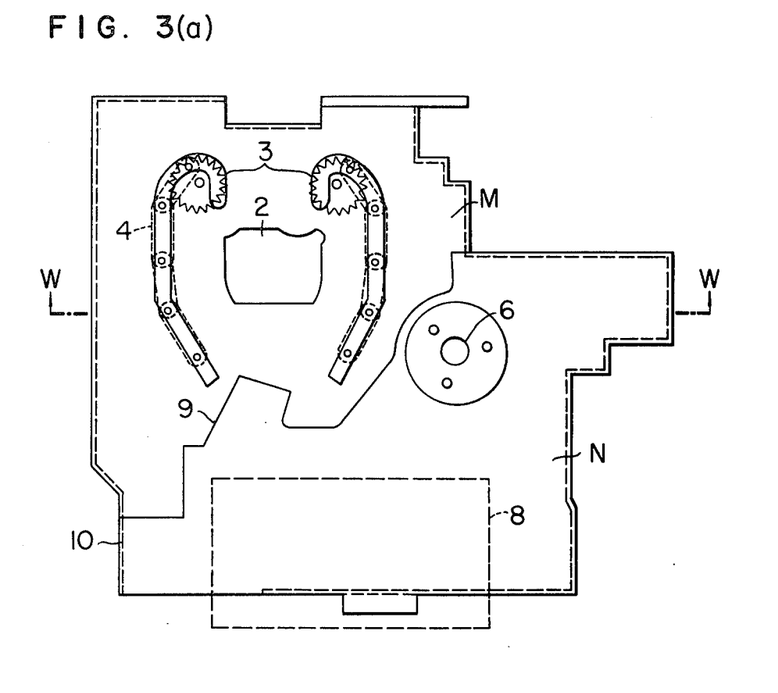
FIG. 3(a) is a schematic plan view of a further embodiment of a chassis for a VTR constructed in accordance with the present invention.
Figure 3B:
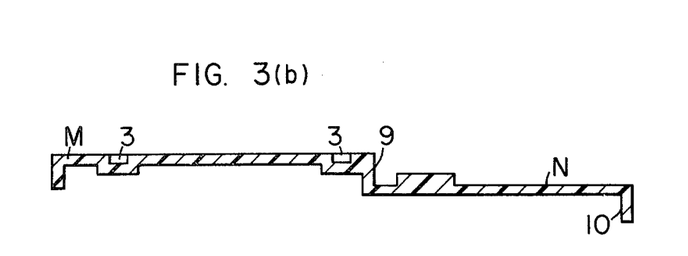
FIG. 3(b) is a cross-sectional view taken along the line W—W in FIG. 3(a)

As shown in FIGS. 2a and 2b, a stepped portion 13 is provided at the central region 11 encompassed by the two guide grooves or walls 3 such that the central region 11 is at a different level from a surrounding area 12. The stepped portion 13 is at a level which is lower than the stepped portion 9 but higher than the surrounding area 12, and the central region 11 meets at a part thereof with the stepped portion 9. This arrangement can further improve the strength and rigidity of the chassis to make it more resistant to deformation with time or creep deformation. A gate 14 is provided in the central region 11, whereby the molding has even less liability to deformation with time than if the gate is provided in some other part.

Figure 4A:
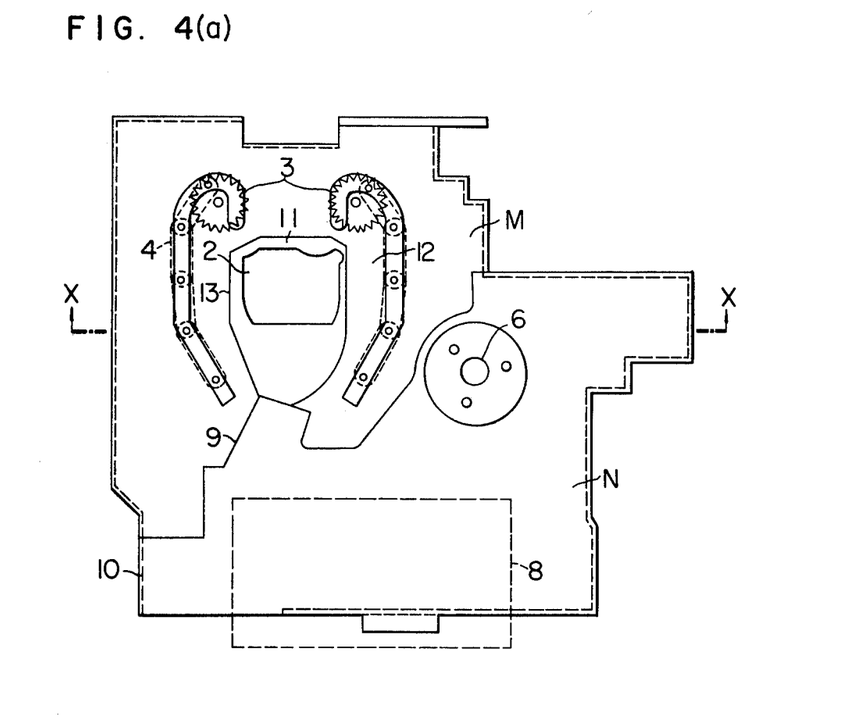
FIG. 4(a) is a schematic plan view of a still further chassis for a VTR constructed in accordance with the present invention.
Figure 4B:
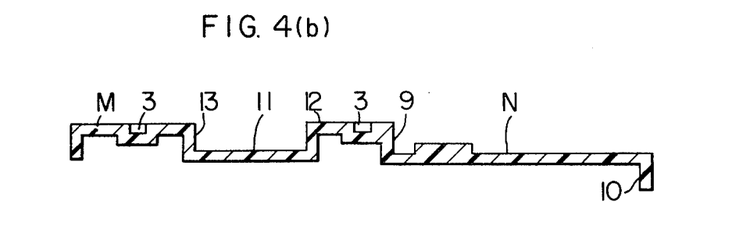
FIG. 4(b) is a cross-sectional view taken along the line X—X in FIG. 4(a)

As shown in FIGS. 4(a) and 4(b) a chassis is provided which differs from that in FIGS. 1(a), 1 (b) and 2(a), 2(b) in that the central region 11 is recessed from its surrounding area 12, however, the chassis of FIGS. 4(a) and 4(b) produces the same effect as in the embodiments of FIGS. 1(a), 1(b) and 2(a), 2(b).

Figure 5A:
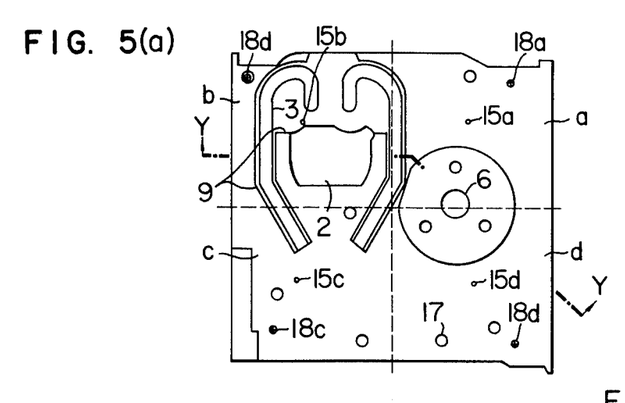
FIG. 5(a) is a schematic plan view of yet another chassis for a VTR constructed in accordance with the present invention.
Figure 5B:
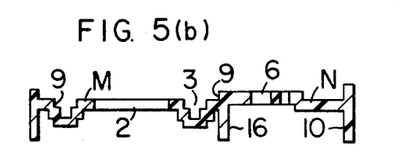
FIG. 5(b) is a cross-sectional view taken along the line Y—Y in FIG. 5(a)
Figure 5C:
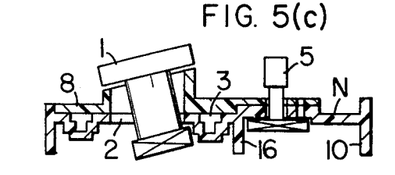
FIG. 5(c) is a cross-sectional view taken along the line Y—Y with components mounted thereon so as to form a sub-chassis.

The chassis of FIGS. 5(a)–5(c) is fashioned of an acrylonitrile-styrene copolymer resin (hereinafter referred to as AS resin) as the resin component instead of polycarbonate used in the preceding embodiments. Also, in FIGS. 5(a)–5(c), the gates are arranged in the chassis molding die such that one gate mark 15a, 15b, 15c or 15d will be positioned in each of the four imaginary regions which are supposed to be formed when the chassis plane is divided crosswise into four equal segments. The chassis for VTR of FIGS. 5(a)–5(c) is molded integrally by using a composition containing 20% by weight or more of glass fibers having a length of about 2 mm or less (the glass fibers having a length of over 10 mm and a diameter of 15 $\mu$m or less are contained in an amount of 5% by weight of the whole glass fibers in the composition). Also, in the glass fibers, the long fibers having a length more than about 50 times the fiber diameter account for approximately 35% of the overall weight of glass fibers and the short fibers having a length about 20 to about 45 times the fiber diameter account for approximately 35% of the overall weight of the glass fibers in the composition.

The resin component in the fiber-reinforced plastic composition used in the chassis of FIGS. 5(a)–5(c) is AS resin which has a specific gravity of about 1.0. When glass fibers are blended to the upper limit of 30% by weight, the composition has a specific gravity of about 1.1 to 1.3. Thus, the fiber-reinforced plastic composition according to this embodiment is far smaller in specific gravity than aluminum (whose specific gravity is 2.7) which is used in the conventional chassis for VTR. Thus, there is provided a chassis for VTR which is light in weight and yet high in precision.

The specified fiber length and blended quantity of glass fibers in the chassis of FIGS. 5(a)–5(c) signify such for the prevention of deformation with time of the molded product. For uniformly dispersing glass fibers in the fiber-reinforced plastic composition, it is best to blend those glass fibers which have a length of greater than 10 mm and less than 20 mm and a diameter of less than 15 $\mu$m in an amount of 5% by weight of the whole glass fibers. Also, for minimizing the possible deformation with time of the molded product, it is desirable to use the fibers with as great length as possible within the defined range, and it is particularly preferable to blend the fibers having a length more than about 50 times the fiber diameter in an amount of at least about 30% of the overall weight of glass fibers used. The total amount of glass fibers blended is preferably 10% by weight or more of the plastic composition.

By providing four to five gates as in the chassis of FIGS. 5(a)–5(c), resin can be uniformly distributed to eliminate defects. Among these gates, particularly one which corresponds to the gate mark 15b has a prominent effect for preventing deformation with time of the molded product. Such multiplication of gates leads to diversified orientation of glass fibers and multipolarization of deformation centering each gate where strain is amassed, resulting in minimized spread of deformation with time.

Since the chassis can be molded integrally in either of the above-described embodiments of this invention, such steps as press-cutting, finish-cutting and caulking or screwing of the metal protuberances are unnecessary thereby greatly reducing the production process. Generally, in case of using a metal for the chassis, it is necessary to assemble the separately formed parts, but according to the present invention, it is possible to mold such "separate parts" as integral parts of the chassis as far as the die makeup permits. This leads to a reduced production cost to allow offering of low-priced commercial products. It is to be also noted that the fiber-reinforced plastic composition used in this invention has a specific gravity of usually about 1.1 to 1.5, which is far smaller than the specific gravity (2.7) of aluminum and signifies possibility of a sizable weight reduction of the product. In the present invention, not only glass fiber but also other organic fiber materials such as carbon fiber, vinylon, etc., can be as effectively used.

Figure 6:
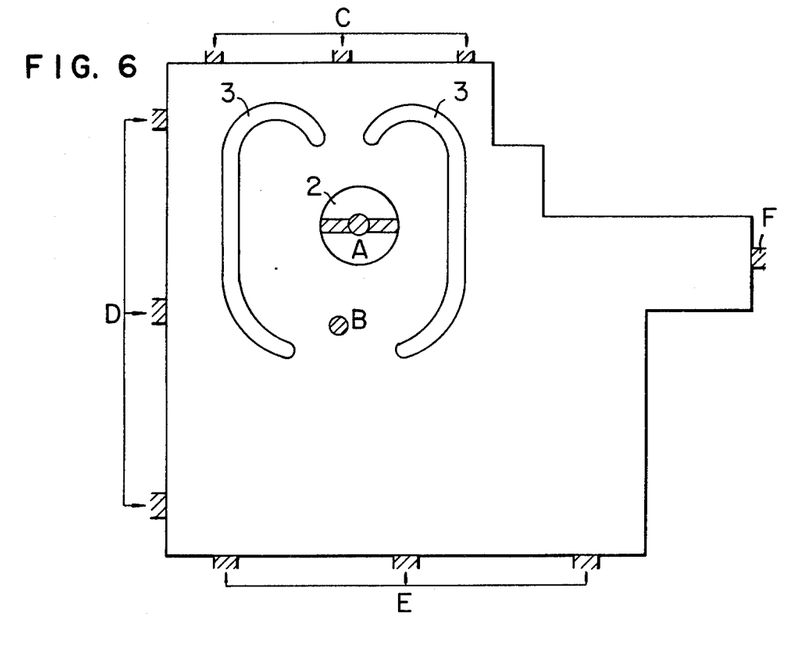
FIG. 6 is a plan view of a chassis model for determing an effect of gate positioning and the molding thereof.
Figure 7:
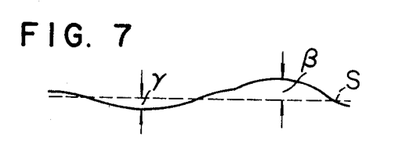
FIG. 7 illustrates an evaluation method for flatness of injection molded parts.
Figure 8:
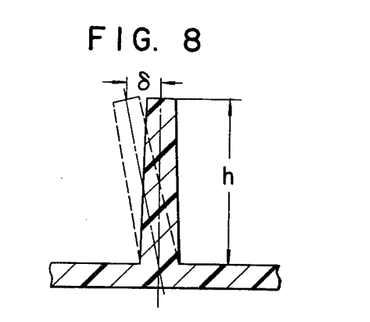
FIG. 8 illustrates an evaluation method for determining an amount of inclination of injection molded parts.

Table 1 shows the results of measurements of deformation with time in case the VTR chassis models having a structure such as shown in FIG. 6 were molded by using various types of plastic materials and heated at 90° C. for 1,400 hours. These chassis models were molded by setting a gate at the location indicated by C in FIG. 6. In the table, the amount of deformation with time was expressed by a value obtained when the initial value was given as 0. The heating temperature of 90° C. used in the test is a temperature to which the commercialized product can be actually heated when placed in a show window or close to a glass window or in a car, etc., and the heating duration of 1,400 hours in the test is the sum of the time periods in which the product may be left heated at 90° C. during its life time in view of the meteorological conditions in Japan. The "required values" used here are within 0.2 mm for the flatness which signifies the amount of warpage or distortion of the plane and within 0.3% for the boss inclination ratio. Flatness $\alpha$ was defined by the formula (1) below from the maximum amount of recession $\gamma$ and the maximum amount of rise $\beta$ from the reference plane S as illustrated in FIG. 7, while a boss inclination ratio $\epsilon$ was defined by the formula (2) below from the amount of inclination $\delta$ and height "h" of the boss as illustrated in FIG. 8.

$$\alpha = \beta + \gamma \quad (1)$$

$$\epsilon = \delta/h \times 100 \quad (2)$$

Also, the moldings used here had a plate thickness of 2 mm on the average. (The plate thickness referred to hereinbelow is 2 mm unless otherwise noted).

TABLE 1

| Resin | Composition Glass fiber length (mm) | Glass fiber content (wt %) | Flatness mm 200h | 600h | 1400h | Inclination ratio of boss % 200h | 600h | 1400h |
|---|---|---|---|---|---|---|---|---|
| Poly-carbonate | 0.5–1.0 | 0 | 0.23 | 0.29 | 0.31 | 0.32 | 0.37 | 0.44 |
| | | 5 | 0.20 | 0.26 | 0.27 | 0.30 | 0.35 | 0.37 |
| | | 10 | 0.11 | 0.16 | 0.18 | 0.18 | 0.21 | 0.22 |
| | | 20 | 0.05 | 0.09 | 0.10 | 0.15 | 0.18 | 0.20 |
| | | 30 | 0.06 | 0.10 | 0.12 | 0.16 | 0.18 | 0.20 |
| | | 40 | 0.08 | 0.15 | 0.18 | 0.19 | 0.24 | 0.25 |
| | 1.0–1.5 | 5 | 0.21 | 0.25 | 0.27 | 0.29 | 0.33 | 0.35 |
| | | 20 | 0.05 | 0.08 | 0.11 | 0.36 | 0.37 | 0.40 |
| | 1.5–2.0 | 5 | 0.23 | 0.28 | 0.29 | 0.28 | 0.31 | 0.34 |
| | | 10 | 0.13 | 0.17 | 0.19 | 0.18 | 0.18 | 0.22 |
| Poly-sulfone | 0.5–1.0 | 0 | 0.20 | 0.20 | 0.24 | 0.32 | 0.35 | 0.37 |
| | | 5 | 0.13 | 0.18 | 0.22 | 0.30 | 0.32 | 0.34 |
| | | 10 | 0.07 | 0.09 | 0.11 | 0.18 | 0.20 | 0.20 |
| | | 30 | 0.07 | 0.10 | 0.12 | 0.20 | 0.23 | 0.23 |
| | 1.0–1.5 | 30 | 0.08 | 0.12 | 0.13 | 0.22 | 0.24 | 0.25 |
| Poly-phenylene sulfide | 0.5–1.0 | 0 | 0.18 | 0.19 | 0.24 | 0.25 | 0.29 | 0.38 |
| | | 5 | 0.18 | 0.20 | 0.23 | 0.22 | 0.28 | 0.35 |
| | | 10 | 0.10 | 0.13 | 0.16 | 0.19 | 0.22 | 0.24 |
| | | 20 | 0.12 | 0.14 | 0.17 | 0.18 | 0.20 | 0.24 |
| | | 30 | 0.12 | 0.14 | 0.18 | 0.18 | 0.21 | 0.24 |
| AS resin | 0.5–1.0 | 0 | 0.19 | 0.20 | 0.25 | 0.27 | 0.33 | 0.36 |
| | | 5 | 0.19 | 0.20 | 0.24 | 0.28 | 0.32 | 0.36 |
| | | 10 | 0.07 | 0.11 | 0.13 | 0.22 | 0.26 | 0.28 |
| | | 30 | 0.08 | 0.13 | 0.14 | 0.20 | 0.22 | 0.24 |
| | 1.0–1.5 | 30 | 0.08 | 0.15 | 0.17 | 0.20 | 0.23 | 0.24 |
| Poly-propylene | 0.5–1.0 | 0 | 0.40 | 0.51 | 0.67 | 0.40 | 0.45 | 0.52 |
| | | 10 | 0.38 | 0.48 | 0.54 | 0.40 | 0.44 | 0.49 |
| | | 20 | 0.40 | 0.47 | 0.50 | 0.38 | 0.44 | 0.50 |
| ABS resin | 0.5–1.0 | 0 | 0.18 | 0.23 | 0.28 | 0.44 | 0.48 | 0.50 |
| | | 10 | 0.19 | 0.22 | 0.27 | 0.36 | 0.37 | 0.37 |
| | | 20 | 0.18 | 0.20 | 0.25 | 0.32 | 0.33 | 0.34 |
| Nylon | 0.5–1.0 | 0 | 0.20 | 0.23 | 0.27 | 0.42 | 0.46 | 0.47 |
| | | 20 | 0.19 | 0.23 | 0.25 | 0.38 | 0.38 | 0.40 |

As seen from Table 1, the required values are satisfied when using the compositions prepared by blending glass fibers in an amount of at least 10% in total weight in either of polycarbonate, polysulfone, polyphenylene sulfide or acrylonitrile copolymer. A particularly good result is obtained when using a composition formed by blending 20% of glass fibers having a length of 0.5–1.0 mm in polycarbonate.

Table 2 shows the results of an examination on the gate position in case of integrally molding the chassis for VTR of the described geometry with plastic. The chassis were molded by setting the gate at the position indicated by A, B, C, D, E or F in FIG. 6 and the change of flatness with time under heating at 90° C. was measured.

TABLE 2

| Time (hr) | Gate Position | | | | | |
|---|---|---|---|---|---|---|
| | A | B | C | D | E | F |
| Flatness (α) mm 200 | 0.03 | 0.04 | 0.05 | 0.08 | 0.08 | 0.10 |
| 600 | 0.05 | 0.05 | 0.09 | 0.11 | 0.12 | 0.13 |
| 1400 | 0.08 | 0.08 | 0.10 | 0.13 | 0.14 | 0.16 |

It is noted from this table that the deformation with time is less when the gate is set in a plane projected in the planar direction than when the gate is set at a side. Thus, generally, the deformation with time can be lessened by setting the gate in a plane projected in the planar direction, but in the case of the above-said composition, it is possible to obtain the products which can meet the prescribed values even when they are molded by setting the gate at a side.

Table 3 shows a comparison in deformation with time and creep deformation between the molding provided with a stepped portion or level difference 9 along the boundary between the tape driving mechanism carried region M and transmission mechanism carried region N as well as a reinforcing rib 10 at most of the outer periphery of the chassis as shown in FIG. 1 (a) and (b) and the molding such as shown in FIG. 6 which is not provided with said stepped portion and reinforcing rib. As seen from the table where the deformation in the molding of FIG. 6 is expressed as 1, both deformation with time and creep deformation are less in the molding of the chassis of FIG. 1 (a) and (b).

TABLE 3

| Test items | Molding configuration | |
|---|---|---|
| | FIG. 6 | FIGS. 1(a), 1(b) |
| Flatness (α) mm | 0.10 | 0.085 |
| Creep deformation | 1 | 0.8 |

The values in the above table are those obtained after leaving the molded articles under heating at 90° C. for 1,400 hours, with the gate being set at the position indicated by C in FIG. 6.

Table 4 shows a similar comparison between the molding of the structure having a stepped portion or level difference 13 between the central region 11 and its surrounding region 12, the height of said stepped portion 13 being lower than that of the stepped portion 9 between the region M and region N, with said central region 11 partly joining the stepped portion 9 as shown in FIG. 2 (a) and (b) and the molding of chassis FIGS. 1(a), 1(b) having no such structure.

TABLE 4

| Test items | Molding configuration | |
|---|---|---|
| | FIGS. 1(a), 1(b) | FIGS. 2(a), 2(b), |
| Flatness (α) mm | 0.085 | 0.07 |
| Creep deformation | 1 | 0.9 |

As noted from the table where creep deformation in the molding of the chassis of FIGS. 1(a), 1(b) is given as 1, both change of flatness with time and creep deformation are further lessened in the molding of FIGS. 2(a)-2(b). The test conditions and gate position were the same as in the case of Table 3.

Table 5 shows a comparison between the product molded by setting the gate 14 in the central region 11 and the product molded by setting the gate at the position of C in FIG. 6 to have a structure shown in FIGS. 2(a), 2(b). It will be seen that the latter product is more improved in flatness.

TABLE 5

| Test items | Molding configuration | |
|---|---|---|
| | FIG. 6 (gate at C) | FIGS. 2(a), 2(b) (gate at 14) |
| Flatness (α) mm | 0.07 | 0.05 |

Figure 9A:
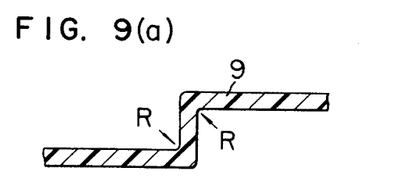
FIG. 9(a) is a cross-sectional view on an enlarged scale, of a stepped portion of a chassis for a VTR constructed in accordance with the present invention.
Figure 9B:
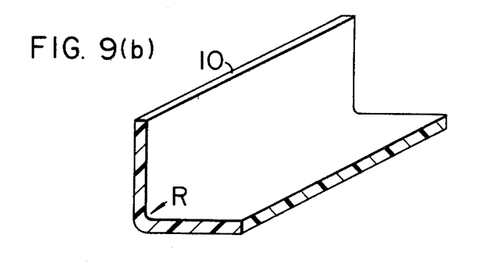
FIG. 9(b) is a cross-sectional view, on an enlarged scale, of reinforcing ribs of a chassis for a VTR constructed in accordance with the present invention.
Figure 9C:
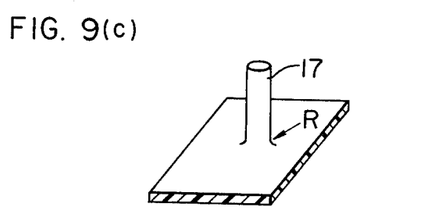
FIG. 9(c) is a cross-sectional view, on an enlarged scale, of a projection of protruberance on a chassis for a VTR constructed in accordance with the present invention.

By providing a stepped portion 9 or 13, reinforcing rib 10 or 16 and protuberance 17 formed on the chassis surface, as shown in FIGS. 9(a)-9(c), is possible to increase the resisting strength against the force loaded in the direction indicated by arrow in these drawings when the radius of curvature R at the base of said stepped portion, reinforcing rib or protuberance is selected to be at least 1 mm.

Figure 10A:
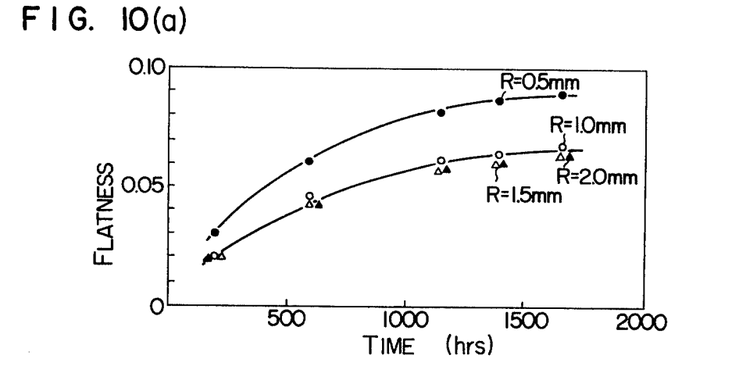
FIG. 10(a) is a graphical illustration of a flatness deformation with time of a VTR chassis.
Figure 10B:
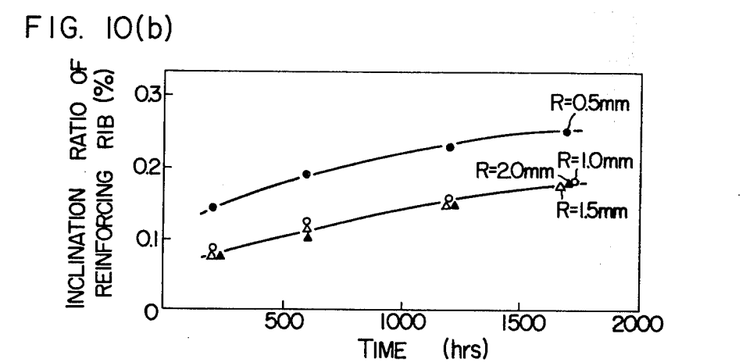
FIG. 10(b) is a graphical illustration of an inclination ratio of the reinforcing rib of the VTR chassis.
Figure 10C:
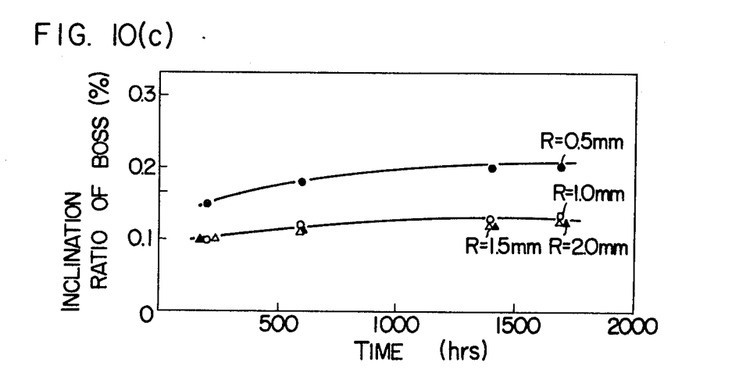
FIG. 10(c) is a graphical illustration of an inclination ratio of a boss of the VTR chassis.

In the graphs of FIGS. 10(a)-10(c) time is plotted as the abscissa and flatness (mm), inclination ratio of reinforcing rib (%) or inclination ratio of boss (%) as the ordinate. Polycarbonate blended with 20% of glass fibers having a length of 0.5-1.0 mm was used in this test. It will be seen from these graphs that the deformation with time is diminished when R is selected to be at least 1 mm.

Table 6 shows the results of determination of the flatness of the respective chassis for VTR having the geometry of FIG. 5, the chassis having been molded by using various types of plastic compositions and mounted with the necessary parts for VTR, and the deformation with time when each said chassis was heated at 40° C. for 100 hours. These chassis were molded by setting the gate at either of 15a-15d in FIG. 5. The shown values of deformation with time are those determined by supposing the initial value to be 0. The heating temperature of 40° C. used here is a temperature to which the commercialized product can be actually heated when VTR is operated. The prescribed values set here are within 100 μm for the flatness which signifies the amount of planar warpage and distortion and within 100 μm for the deformation with time. Flatness α was defined according to FIG. 7 and formula (1). The deformation with time was determined by measuring the amount of change in linear distance between either two of the dimensional measuring points 18a, 18b, 18c and 18d (in FIG. 5) after heating a 40° C. for 100 hours.

TABLE 6

| Composition | | | Dimensional change (mm) | | |
|---|---|---|---|---|---|
| Resin | Glass fiber content (wt %) | Flatness (mm) | Between 18a-18b | Between 18a-18c | Between 18a-18d |
| Poly-carbonate | 0 | 0.24 | 0.105 | 0.107 | 0.081 |
| | 10 | 0.08 | 0.072 | 0.060 | 0.041 |
| | 20 | 0.05 | 0.037 | 0.037 | 0.046 |
| | 30 | 0.06 | 0.035 | 0.041 | 0.038 |
| Poly-sulfone | 0 | 0.21 | 0.087 | 0.099 | 0.106 |
| | 10 | 0.09 | 0.045 | 0.043 | 0.048 |
| | 20 | 0.05 | 0.042 | 0.051 | 0.027 |
| | 30 | 0.06 | 0.038 | 0.047 | 0.041 |
| Poly-ethylene sulfide | 0 | 0.20 | 0.107 | 0.110 | 0.097 |
| | 10 | 0.08 | 0.075 | 0.062 | 0.041 |
| | 20 | 0.08 | 0.060 | 0.038 | 0.050 |
| | 30 | 0.06 | 0.042 | 0.040 | 0.037 |
| AS resin | 0 | 0.20 | 0.127 | 0.106 | 0.118 |

TABLE 6-continued

| Resin | Composition Glass fiber content (wt %) | Flatness (mm) | Dimensional change (mm) | | |
|---|---|---|---|---|---|
| | | | Between 18a-18b | Between 18a-18c | Between 18a-18d |
| | 10 | 0.06 | 0.068 | 0.072 | 0.051 |
| | 20 | 0.07 | 0.051 | 0.050 | 0.047 |
| | 30 | 0.06 | 0.052 | 0.050 | 0.039 |
| Poly- | 10 | 0.37 | 0.182 | 0.105 | 0.082 |
| propylene | 20 | 0.35 | 0.105 | 0.088 | 0.081 |
| | 30 | 0.30 | 0.085 | 0.087 | 0.065 |
| ABS resin | 10 | 0.20 | 0.192 | 0.207 | 0.157 |
| | 20 | 0.17 | 0.153 | 0.162 | 0.200 |
| | 30 | 0.18 | 0.161 | 0.111 | 0.140 |
| Nylon | 10 | 0.20 | 0.301 | 0.289 | 0.277 |
| | 20 | 0.15 | 0.156 | 0.200 | 0.109 |
| | 30 | 0.16 | 0.201 | 0.157 | 0.127 |

As seen from Table 6, the chassis moldings which meet the prescribed values are those obtained by using a composition formed by blending glass fibers in an amount of at least 10% of the overall weight (of the composition) in either of polycarbonate, polysulfone, polyphenylene sulfide or AS resin. It will be also noted that a particularly good result is obtained when using a composition prepared by blending 20% of glass fiber having a length of 1.0-2.0 mm in AS resin.

The significance of the gate position is discussed more fully hereinbelow.

If only one gate is provided in the molding die cavity of a complicated configuration, the internal strain in the molding tends to be amassed at the gate portion to cause warping or distortion at and in the vicinity of the gate portion for the reasons that a high pressure is exerted to the gate portion during molding and that the plastic flow is constricted at the gate portion to cause a regulated molecular orientation. Also, since the molten plastic flows while being cooled in the molding die cavity, if only one gate is used, the deeper the molten plastic flows from the gate, the greater becomes the flow resistance, requiring use of a greater amount of pressure, that is, a greater amount of consumption of energy for the molding while producing a greater amount of internal strain. Development of a large amount of internal strain leads to a reduced strength of the product and increased liability to cracking by the action of the chemicals or oils. The strength of the weld line formed upon merging of the molten plastic flow in the rear of an obstacle is generally low, but it is known in the art of injection molding that such weld line strength is further lowered as the distance from the gate to said weld line increases. Further, in case the configuration of the work to be molded is complicated, if the molding operation is performed by using only one gate, no sufficient pressure is given to terminal ends of the molding, resulting in insufficient packing of plastic and formation of sink marks. In order to overcome such problems, it is generally attempted in the art of injection molding to increase the number of gates. However, such an increase of the gate number could encourage deformation in the cases involving certain positional relationship of the gates and also complicantes the molten plastic flow to make it more liable to cause non-uniformity of molding shrinkage. Therefore, the gate arrangement must be corrected by the method of trial and error, and thus in the prior art, a long time has been required for the correction of the die.

The present invention succeeds obtaining a plastic injection molding with minimized deformation with time by dispersing the internal strain in the molding by adopting the newly invented techniques according to which the gates are provided at two or more parts in the planar portion of the cavity so that the molten plastic flowing in from the respective gates will reach the weld line formed at the location where the leading ends of the molten plastic flows from the respective gates impinge against each other and will also reach the peripheral part of the cavity so that the molten plastic flows from the respective gates will become substantially equal in flow resistance produced in the course of filling-up of the lamellar cavity with molten plastic.

Figure 11:
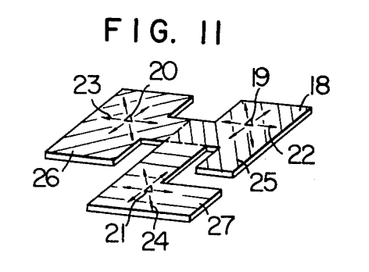
FIG. 11 is a plant view of a lamellar injection molding die cavity for a preferred injection molding in accordance with the present invention.

As shown in FIG. 11, gates 19, 20, 21 are provided on a planar inner surface of a lamellar cavity 18, with the gates 19, 20 and 21 being so arranged that the flow resistance produced in the course of filling-up of the cavity 18 with molten plastic flowing from the respective gates 19, 20 and 21 in the directions of arrows 22, 23 and 24 will become substantially equal in the respective blocks 25, 26 and 27 formed by filling the molten plastic flowing in from the respective gates 19, 20 and 21, with the blocks being indicated by the different oblique lines. Although there are provided three gates in this model, it is possible to provide a greater number of gates.

The use of a lamellar cavity 18 can minimize the internal strain produced in the molding and can also disperse the internal strain concentrated at the gates so that the deformations produced around the respective gates counteract each other to suppress warpage or distortion.

In this method, it is desirable to make the pressures at the respective gates as equal as possible. Under an equalized pressure, the plastic filling rate can be also substantially equalized, allowing further lessening of internal strain which might be produced.

Figure 12:
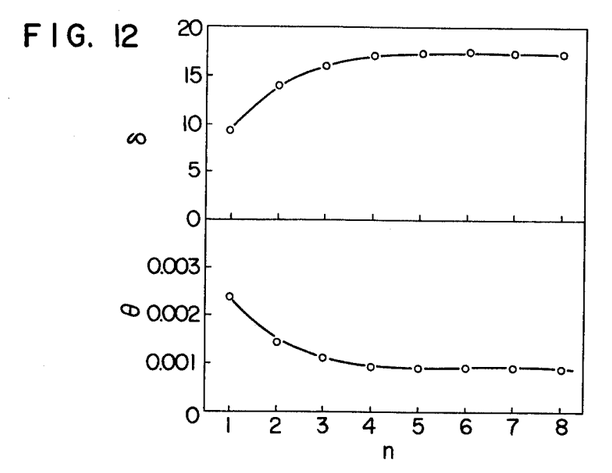
FIG. 12 is a graphical illustration of a relationship between a number of gates and the strength and warpage of a VTR chassis.
Figure 13:
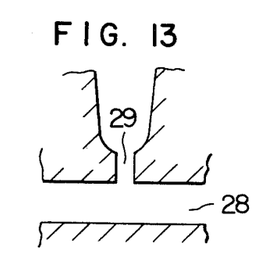
FIG. 13 is a cross-sectional view of a gate and adjoining area illustrating a preferred gate configuration.
Figure 14A:
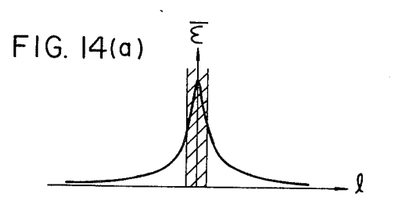
FIG. 14(a) is a graphical illustration of a relationship between a distance from a gate and internal strain with a narrow gate area.
Figure 14B:
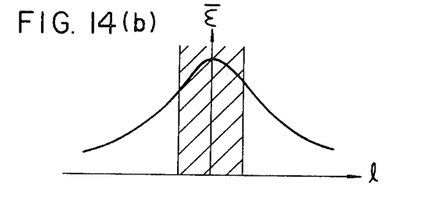
FIG. 14(b) is a graphical illustration of a relationship between a distance from a gate and an internal strain with a wide gate area.

It is most desirable to provide the gates at four to five locations and FIG. 12 shows the relationship between the number of gates (n) and the falling ball impact strength ($\delta$) at the weld line portion and warpage ($\theta$) per unit length. As shown in FIG. 12, when the gates are provided at three locations, the falling ball impact strength ($\delta$) at the weld line is somewhat low and the warpage ($\theta$) is also large, but when the gates are provided at four or more locations, there is not much difference in both impact strength ($\delta$) and warpage ($\theta$). However, in case of providing the gates at more than six locations, the die working process is elongated and also the working itself may become difficult to carry out. Thus, provision of the gates at four to five locations is preferable. As for the type of the gate, it is preferred to use a so-called pin-point gate 29 forming a constriction at the part where molten plastic is just about to enter the cavity 28 as shown in FIGS. 13. FIGS. 14(a) and 14(b) show the relationship between the distance l from the gate and the internal strain $\bar{\epsilon}$. The area with hatching indicates the gate region. FIG. 14(a) shows the case using a pin-point gate which provides a narrow gate area, and FIG. 14(b) shows the case using a gate with a wide area. If the gate area is large, the region with high internal strain is widened as shown in FIG. 14(b) to increase the possibility of deformation, but if the gate area is small, the region where internal strain is concentrated is diminished as shown in FIG. 14(a) so that the deformation occuring about the gate is suppressed by the surrounding region with small internal strain and thus discouraged from expanding.

Figure 15:
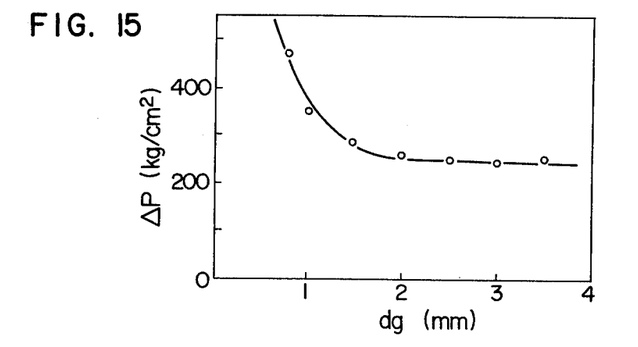
FIG. 15 is a graphical illustration of a relationship between a gate diamter and pressure loss.

FIG. 15 is a graph showing the relationship between gate diameter dg (mm) and pressure loss $\Delta p$ (kg/cm$^2$) as determined in an experiment conducted with a gate length of 2 mm and by using a fiber-reinforced plastic composition comprising an acrylonitrile-styrene copolymer blended with 20% by weight of glass fiber. The results indicate that, if the gate diameter is less than 0.1 mm, pressure loss is large and moldability is bad, while if the gate diameter exceeds 2.5 mm considerable time is required for cutting, so that the preferred range of gate diameter is from 1.5 to 2.5 mm. Such range, however, is not defined by the configuration of the molding.

Figure 16:
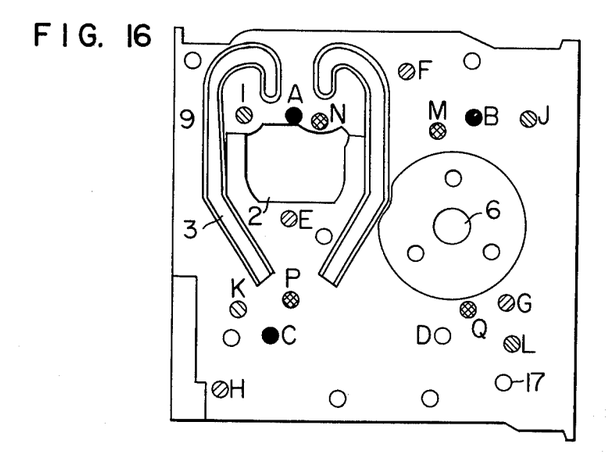
FIG. 16 is a plan view of a chassis molded for determinging an effect of a gate positioning in a chassis for a VTR obtained by injection molding techniques.
Figure 17:
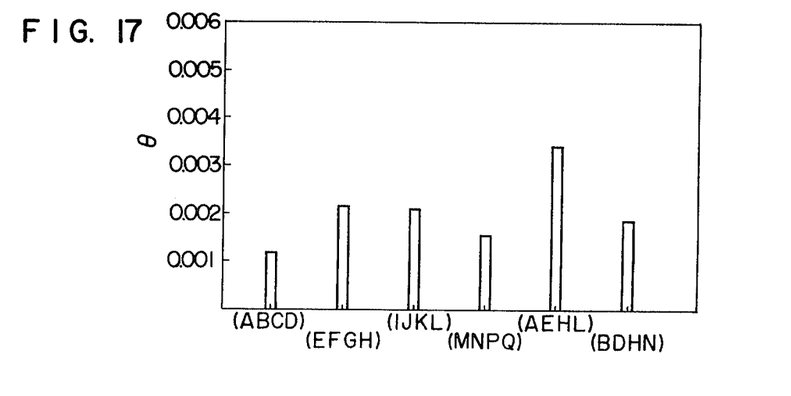
FIG. 17 is a graphical illustration of a relationship between a gate position and warpage when a VTR chassis of FIG. 16 was injection molded with changed gate positions.
Figure 18:
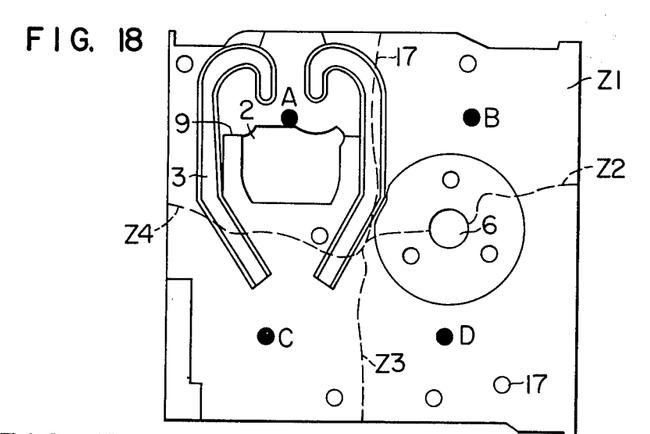
FIG. 18 is an illustration of a weld line formation.

As shown in FIG. 17, the value of $\theta$ when the chassis was produced by using various combinations of four of the gates at the locations A, B, C, D, E, F, G, H, I, J, K, L, M, N, P and Q in FIG. 16, the gate positions best suited for molding of the chassis of this invention are the following four locations: a location near the upper ends of the two guide grooves 3 around the head installing hole 2, a location near the lower ends of said guide grooves 3, a location above the capstan motor carrying hole 6 and a location below said hole 6, particularly, the locations indicated by letters A, B, C and D in FIG. 16. When the gates are provided at these four locations, four weld lines are formed as indicated by Z1, Z2, Z3 and Z4 in FIG. 18 to minimize the deformation with time.

FIG. 17 shows the deforamtion with time, as expressed in terms of warpage $\theta$ per unit length after continuous 1,000-hour heating at 90° C. of the injection moldings obtained by setting the gates at the positions of (A, B, C and D), (E, F, G and H), (I, J, K and L), (M, N, P and Q), (A, E, H and L) and (B, D, H and N) and by using the AS resin containing 20% by weight of glass fiber.

Figure 19:
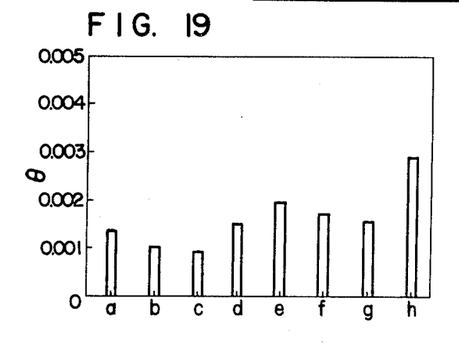
FIG. 19 is a graphical illustration of a relationship between various compositions and warpage.

FIG. 19 provides a graphical illustration of the deformation with time, as expressed in terms of warpage $\theta$ per unit length after continuous 1,000-hour heating at 90° C. of the lamellar injection moldings obtained by using various types of material, that is, (a) AS resin blended with 20% by weight of glass fiber, (b) polycarbonate blended with 30% by weight of glass fiber, (c) polysulfone blended with 30% by weight of glass fiber, (d) acrylonitrile-butadiene-styrene copolymer blended with 20% by weight of glass fiber, (e) AS resin, (f) polycarbonate, (g) polysulfone, and (h) acrylonitrile-butadiene-styrene copolymer. As shown in FIG. 19 the materials of (a), (b) and (c) cause less deformation with time than other materials and are best suited for use as material of lamellar injection moldings.

Figure 20:
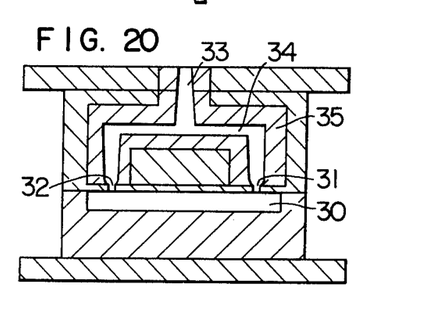
FIG. 20 is a cross-sectional view of a preferred die model for a VTR chassis constructed in accordance with the present invention.

A die model used for injection molding of the VTR chassis may, as shown in FIG. 20, include a cavity 30, gates 31, 32, a sprue 33, and a runner 34. The die is provided a heating block 35 adapted for heating the gates 31 and 32, sprue 33 and runner 34 and for maintaining the plastic therein in a molten state. This arrangement can eliminate loss of plastic in the sprue 33 or runner 34 and can also exclude use of unnecessary material. Further, since the molten plastic is not cooled before reaching the cavity 30, molding is facilitated and development of internal strain is suppressed.

Thus, by providing a suitable number of gates in the molding die cavity and specifying their arrangement in conformity to the configuration of the molding to be formed, it is possible to elevate the plastic filling rate into the cavity during the molding operation and to speed up the molding cycle. Also, since the degree of cooling during flow of the plastic material is lessened, generation of internal strain in the molding is minimized. Generally, when only a few number of gates are provided, internal strain is concentrated at the gate portions of the molding, but according to this invention, since the number of the gates is increased, the degree of increment of flow resistance due to cooling is lessened to allow a decrease of molding pressure to the gate positions, and also internal strain at the gate portions is reduced to improve the various properties of the molding such as strength while also minimizing the deformation with time. Particularly, the deformation with time is excessively limited since the internal strains at the respective gate portions counteract each other.

What is claimed is:

1. In a chassis for a video tape recorder comprising a lamellar part for carrying a magnetic tape cassette, a guide drum with magnetic head, a capstan roller and a mechanism for drawing out the magnetic tape from said magnetic tape cassette and loading it around said magnetic head and said capstan roller, said lamellar part having a first hole for installing said guide drum with magnetic head and a second hole for installing said capstan roller, the improvement wherein said chassis is molded integrally with a fiber-reinforced plastic composition and further provided with two guide grooves and/or guide walls encompassing said first hole and designed to guide a sliding movement of said loading mechanism and a reinforcing rib along a boundary between a first region including said guide grooves or guide walls and a second region including said second hole.

2. A chassis for a video tape recorder according to claim 1, wherein said fiber-reinforced plastic composition comprises one type of resin selected from a group consisting of polycarbonate, polysufone, polyphenylene sulfide and acrylonitrile-styrene copolymer and reinforcing fiber.

3. A chassis for a video tape recorder according to claim 1, wherein the reinforcing fiber in said fiber-reinforced plastic composition is glass fiber.

4. A chassis for a video tape recorder according to claim 3, wherein 5% by weight or more of the whole glass fiber component is occupied by those glass fibers which have a length of 1.0 mm or longer and a diameter of 15 $\mu$m or less.

5. A chassis for a video tape recorder according to claim 3, wherein said fiber-reinforced plastic composition contains glass fiber in an amount of at least 10% by weight.

6. A chassis for a video tape recorder according to claim 1, wherein said fiber-reinforced plastic composition is a composition prepared by blending polycarbonate with glass fibers having a length of 0.5–1.0 mm in an amount of 20–30% of an overall weight of the composition.

7. A chassis for a video tape recorder according to claim 1, wherein said reinforcing rib is formed by providing said first region at different levels and said second region.

8. A chassis for a video tape recorder according to claim 1, wherein at least one injection molding gate is provided in a region encompassed by said two guide grooves.

9. A chassis for a video tape recorder according to claim 7, wherein the region encompassed by said two guide grooves includes a central region including said first hole and a region surrounding said central region, said central region and said surrounding region being demarcated by a difference in level formed such that said central region has a higher level than said surrounding region, said difference in level being smaller than the difference in level between said first region and said second region.

10. A chassis for a video tape recorder according to claim 1, wherein the radius of curvature at the base of said reinforcing rib is at least 1 mm.

11. In a chassis for a video tape recorder comprising a lamellar part for carrying a magnetic tape cassette, a guide drum with magnetic head, a capstan roller and a mechanism for drawing out a magnetic tape from said magnetic tape cassette and loading the tape around said magnetic head and said capstan roller, said lamellar part having a first hole for installing said guide drum with magnetic head and a second hole for installing said capstan roller, the improvement wherein injection molding gates are arranged in a cavity of the moding die such that a molten plastic composition flowing in through said respective gates will reach each other substantially equally so that a weld line is formed at a position where leading ends of said respective molten plastic composition flows impinge against each other and a periphery of said cavity as said molten plastic composition, a fiber-reinforced plastic composition, is poured in through said respective gates and solidified, two guide grooves and/or guide walls encompassing said first hole and designed to guide a sliding movement of said loading mechanism, and a reinforcing rib along the boundary between a first region including said guide grooves or guide walls and a second region including said second hole.

12. A chassis for a video tape recorder according to claim 11, wherein four or five gates are provided.

13. A chassis for a video tape recorder according to claim 11, wherein each said gate is formed by constricting a portion of the gate.

14. A chassis for a video tape recorder according to claim 11, wherein each gate has a diameter of 1.5–2.5 mm.

15. In a chassis for a video tape recording comprising a lamellar part for carrying a magnetic tape cassette, a guide drum with magnetic head, a capstan roller and a mechanism for drawing out a magnetic tape from said magnetic tape cassette and loading the tape around said magnetic head and said capstan roller, said lamellar part having a first hole for installing said guide drum with magnetic head and a second hole for installing said capstan roller, the improvement wherein said chassis is molded integrally with a fiber-reinforced plastic composition in which 5% by weight or more of the whole glass fiber component is occupied by glass fibers having a length of over 1.0 mm and a diameter of 15 $\mu$m or less, and wherein two guide grooves are provided to guide a sliding movement of said loading mechanism, said guide grooves being covered by a sub-chassis for determining a position of said guide drum with magnetic head and also arranged so as to encompass said first hole, and a first reinforcing rib arranged between one of said guide grooves closer to said capstan roller and a region including said second hole and a second reinforcing rib arranged along most of a periphery of the chassis.

16. A chassis for a video tape recording according to claim 1, wherein said first region and said second region are arranged at different levels and said reinforcing rib is formed by a stepped portion between said first and second region.

17. A chassis for a video tape recording according to claim 16, wherein a second reinforcing rib is provided, said second reinforcing rib being disposed around a substantial portion of an outer periphery of the chassis.

18. A chassis for a video tape recording according to claim 1, wherein a stepped portion is provided in a central region encompassed by the two guide grooves or guide walls, said stepped portion defines a surface disposed at a level above a surface of the first region and below a surface of the second region.

19. A chassis for a video tape recording according to claim 1, wherein a stepped portion is provided in a central region encompassed by the two guide grooves or guide walls, said stepped portion defines a surface disposed on a level below a surface of said first region.

20. A chassis for a video tape recording according to claim 19, wherein said surface defined by said stepped portion is disposed substantially at a same level as a surface of the second region.

* * * * *